US010302897B2

(12) United States Patent
Bolis

(10) Patent No.: US 10,302,897 B2
(45) Date of Patent: May 28, 2019

(54) OPTICAL DEVICE WITH DEFORMABLE MEMBRANE HAVING REDUCED RESPONSE TIME

(71) Applicant: Webster Capital LLC, Wilmington, DE (US)

(72) Inventor: Sébastien Bolis, Crolles (FR)

(73) Assignee: Webster Capital LLC, Wilmington, DE (US)

( * ) Notice: Subject to any disclaimer, the term of this patent is extended or adjusted under 35 U.S.C. 154(b) by 37 days.

(21) Appl. No.: 15/127,411

(22) PCT Filed: Mar. 20, 2015

(86) PCT No.: PCT/EP2015/055920
§ 371 (c)(1),
(2) Date: Sep. 19, 2016

(87) PCT Pub. No.: WO2015/140294
PCT Pub. Date: Sep. 24, 2015

(65) Prior Publication Data
US 2017/0131515 A1  May 11, 2017

(30) Foreign Application Priority Data
Mar. 20, 2014 (FR) .................... 14 52342

(51) Int. Cl.
*G02B 7/02* (2006.01)
*G02B 3/12* (2006.01)
*G02B 3/14* (2006.01)

(52) U.S. Cl.
CPC ............ *G02B 7/028* (2013.01); *G02B 3/12* (2013.01); *G02B 3/14* (2013.01)

(58) Field of Classification Search
CPC . G02B 1/06; G02B 7/02; G02B 7/021; G02B 7/028; G02B 3/12; G02B 3/14;
(Continued)

(56) References Cited

U.S. PATENT DOCUMENTS

| 2008/0135541 A1* | 6/2008 | Peng | ............... | H05B 3/683 |
| | | | | 219/438 |
| 2008/0144186 A1* | 6/2008 | Feng | ............... | G02B 3/14 |
| | | | | 359/666 |

(Continued)

FOREIGN PATENT DOCUMENTS

CN   106170719   11/2016

OTHER PUBLICATIONS

Office Action from Chinese Application No. 201580011268.8, dated Apr. 19, 2017, Webster Capital LLC, pp. 1-12.
(Continued)

*Primary Examiner* — Jie Lei
(74) *Attorney, Agent, or Firm* — Robert C. Kowert; Meyertons, Hood, Kivlin, Kowert & Goetzel, P.C.

(57) ABSTRACT

An optical device has a deformable membrane and a support to which a peripheral anchoring area of said membrane is connected. The optical device further includes a cavity filled with a constant volume of fluid, the cavity being delimited by the membrane, a base extending substantially parallel to the membrane and a wall of the support extending between the base and the membrane. The optical device further includes an actuation device of an area of the membrane located between the peripheral anchoring area and a central part of the membrane, configured to bend by application of electrical actuation voltage so as to move some of the volume of fluid located in a flow region located between the actuation area of the membrane and the base of the cavity. The optical device also includes a heating element adapted to locally heat the fluid in the flow region.

28 Claims, 12 Drawing Sheets

(58) Field of Classification Search
CPC ...... G02B 15/173; F27D 11/06; A47J 27/004; G06K 7/14; H01L 21/67103
USPC ........ 359/665, 666, 676, 811, 820; 219/438, 219/441, 446.1, 448.11
See application file for complete search history.

(56) References Cited

U.S. PATENT DOCUMENTS

| | | |
|---|---|---|
| 2009/0086331 A1 | 4/2009 | Gunasekaran et al. |
| 2011/0051255 A1 | 3/2011 | Lee et al. |
| 2012/0069450 A1* | 3/2012 | Bolis ........................ G02B 3/14 359/665 |

OTHER PUBLICATIONS

Office Action from European Patent Application No. PCT/EP2015/055920, dated Apr. 30, 2018, Webster Capital LLC, pp. 1-6.
Notice of Allowance from Chinese Application No. 201580011268.8, dated Sep. 28, 2017 (Chinese version only), pp. 1-7.

* cited by examiner

OPTICAL DEVICE WITH DEFORMABLE MEMBRANE HAVING REDUCED RESPONSE TIME

FIELD OF THE INVENTION

The present invention relates to an optical device with deformable membrane and a method for reducing the response time of such a device.

BACKGROUND OF THE INVENTION

It is known to form an optical device by enclosing a constant volume of fluid between a deformable membrane and a support having a face extending substantially parallel to the membrane.

A peripheral anchoring area of the membrane is connected to the support.

The central part constitutes the optical field of the device.

An actuation device of the membrane is arranged in an area of the membrane, said actuation area located between the peripheral anchoring area and the central part.

Said actuation device comprises one or more actuators capable of bending towards the fluid and/or in the direction opposite the fluid under application of electrical actuation voltage.

Bending of the actuation device causes a variation in the thickness of fluid between the membrane and the face of the support opposite the membrane, which guides the flow of the volume of fluid located in this region either towards the centre of the device or towards the periphery of the device. "Flow region" refers that part of the volume of fluid located between the actuation area of the membrane and the face of the support opposite the membrane.

The effect of the flow of the volume of fluid is to modify the fluid pressure to which the central part of the membrane is subjected, manifest by deformation of said central part and modifying the focal length of the device.

The response time of such an optical device is defined as being the interval between the instant to which electrical actuation voltage is applied to the actuation device in light of obtaining a determined focal length and the instant at which the preferred focal length effectively is achieved.

This response time is connected to the capacity of the fluid to escape from the flow region towards the central part of the device or vice versa.

To boost performance of the device, generally the aim is to reduce this response time.

Document FR 2 965 068 describes a particular arrangement of the optical device for reducing the response time. In the cavity defined by the membrane and the support, this arrangement comprises a structure delimiting a main chamber at the level of the central part of the membrane and a peripheral chamber at the level of the flow region. Said chambers are in fluidic communication at the level of said structure. The geometry of the device is adapted to force the flow of the fluid through said structure of the main chamber towards the peripheral chamber or vice versa and limit the amount of fluid in the device.

But there is a need to further improve the response time of this type of optical device.

BRIEF DESCRIPTION OF THE INVENTION

An aim of the invention is therefore to design an optical device having reduced response time.

According to the invention, an optical device is proposed comprising:
- a deformable membrane,
- a support to which a peripheral anchoring area of said membrane is connected,
- a cavity filled with a constant volume of fluid, said cavity being delimited by the membrane, a base extending substantially parallel to the membrane and a wall of the support extending the base and the membrane,
- an actuation device of an area of the membrane located between the peripheral anchoring area and a central part of the membrane, configured to bend by application of electrical actuation voltage so as to move some of the volume of fluid located in a region, so-called flow region, located between the actuation area of the membrane and the base of the cavity, said optical device being characterized in that it comprises a heating element adapted to locally heat the fluid located in the flow region and/or in a region of the cavity located opposite the central part of the membrane.

According to an embodiment, the base of the cavity is a wall of the support.

According to an embodiment, the heating element is arranged on the base of the cavity.

A thermal insulation element can be interposed between the heating element and the base of the cavity.

Advantageously, the heating element is arranged on a region of the base opposite the flow region.

According to an embodiment, the device comprises a thermal insulation element between the heating element and the support.

According to an embodiment of the invention, the base of the cavity comprises an additional deformable membrane.

According to an embodiment, the heating element is arranged in the cavity, in contact with the fluid.

According to an embodiment, the heating element is arranged on or under the actuation area of the membrane.

According to an embodiment, the heating element forms part of the actuation device of the membrane.

Therefore, if the actuation device of the membrane is a piezoelectric device comprising a stack of a piezoelectric layer and at least two electrodes arranged on either side of the piezoelectric layer and at least one of said electrodes constitutes the heating element.

According to an embodiment, the heating element has an annular shape facing the actuation area of the membrane.

According to an embodiment, the heating element is arranged on the wall of the cavity extending between the base and the membrane.

According to an embodiment, the heating element is transparent to at least one wavelength of the visible field.

According to an embodiment, the heating element further comprises a heat-diffusion element extending between the fluid and the heating element, said heat-diffusion element having a surface larger than that of the heating element.

According to an embodiment, the device comprises a thermal insulation element between the heating element and the membrane.

According to an embodiment, the heating element comprises a heating resistor comprising two connection terminals, the optical device further comprising a control system connected between the terminals of said resistor for passing an electric current through the resistor.

Advantageously, the device comprises a temperature sensor and the control system is configured for passing an electric current through the heating resistor when the temperature measured by said sensor is less than a threshold.

According to an embodiment, the control system is configured for passing an electric current through the heating resistor as soon as one of the following conditions is fulfilled: the actuation device of the membrane is activated, the control system receives a start signal from the device or the response of the optical device is not in accordance with the expected response.

Optionally, the control system is configured to cease circulating electric current through the heating resistor at the end of a determined period.

Another object of the invention relates to an imaging device comprising at least an optical device such as described hereinabove.

Another object of the invention relates to a method for reducing the response time of an optical device comprising:
- a deformable membrane,
- a support to which a peripheral anchoring area of said membrane is connected,
- a cavity filled with a constant volume of fluid, said cavity being delimited by the membrane, a base extending substantially parallel to the membrane and a wall of the support extending between the base and the membrane,
- an actuation device of an area of the membrane located between the peripheral anchoring area and a central part of the membrane, configured to bend by application of electrical actuation voltage so as to move some of the volume of fluid located in a region, so-called flow region, located between the actuation area of the membrane and a face of the support opposite said membrane, said method being characterized in that it comprises localised heating of the fluid in the flow region and/or in part of the cavity located opposite the central part of the membrane so as to reduce the viscosity of the fluid in said region(s).

According to an embodiment, the heating is limited to the flow region.

According to an embodiment, said method comprises measuring temperature in the environment of said optical device and the heating is carried out when said temperature is less than a threshold.

According to an embodiment, the heating is carried out as soon as the actuation device is activated.

Optionally, the heating ceases at the end of a determined period.

According to an embodiment, heating is performed by pulses.

According to an embodiment, the actuation device of the membrane is a piezoelectric device comprising a stack of a piezoelectric layer and at least two electrodes arranged on either side of the piezoelectric layer and heating is created by passing an electric current in said electrodes.

Advantageously, a difference in potential is applied to the terminals of each electrode in such a way that the difference between the potential of both electrodes is constant over the surface of the piezoelectric layer.

BRIEF DESCRIPTION OF THE DRAWINGS

Other characteristics and advantages of the invention will emerge from the following detailed description, in reference to the appended drawings, in which.

Figure 1:
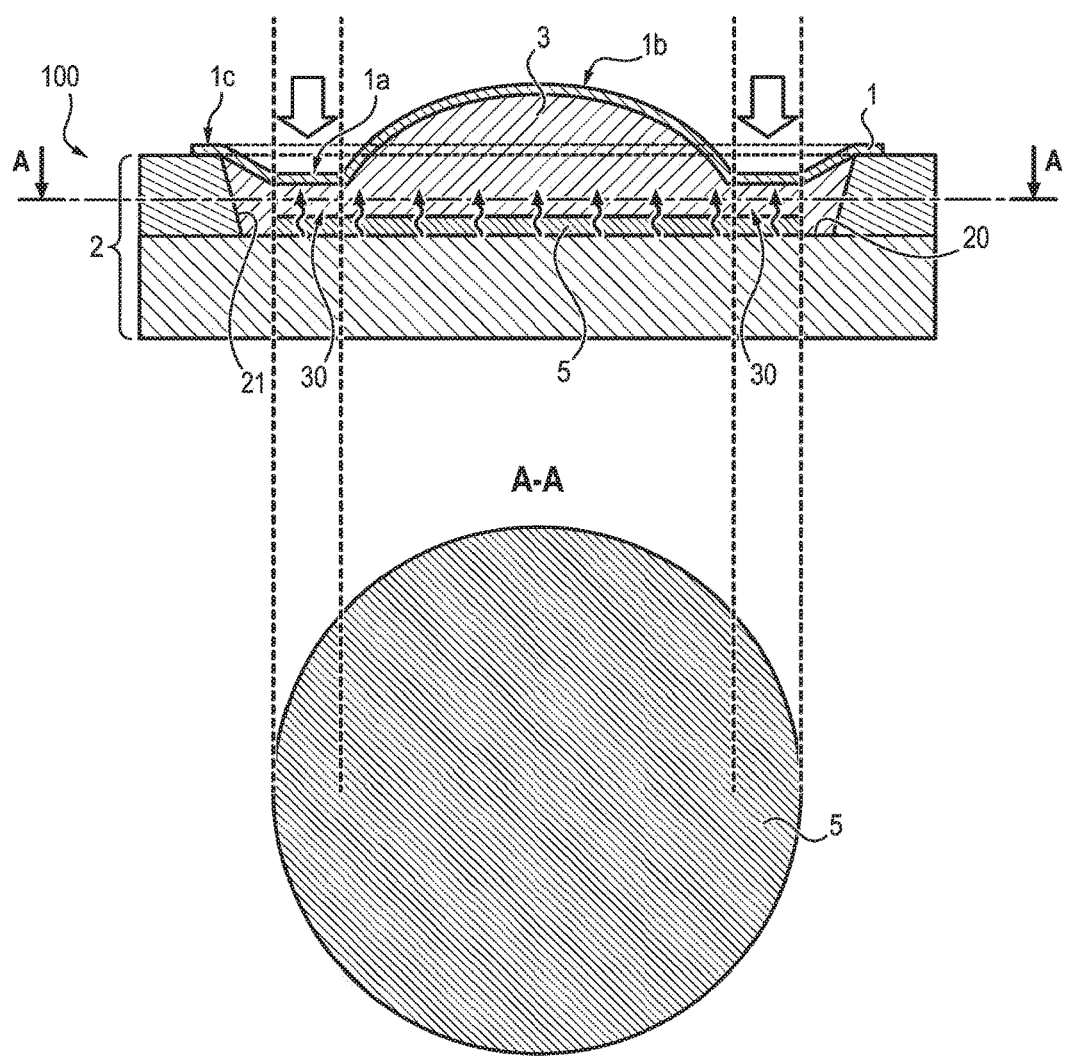
FIG. 1 is a sectional view of an optical device in which the heating element is arranged over substantially the entire surface of the base of the cavity containing fluid.

For reasons of clarity in the figures, the different elements illustrated are not necessarily shown to the same scale.

The reference numerals are used from one figure to the other to designate the same elements.

DETAILED DESCRIPTION OF EMBODIMENTS OF THE INVENTION

The optical device generally comprises a cavity filled with a constant volume of fluid, said cavity being delimited:
on the one hand, by a deformable membrane,
on the other hand, by a base extending substantially parallel to the membrane,
finally, by a wall of the support to which a peripheral anchoring area of the membrane is connected, said wall extending between the base and said deformable membrane.

The membrane comprises a central part which corresponds to an optical field of the optical device.

The membrane comprises therefore a face, so-called inner face, which is in contact with the fluid, and an opposite face, so-called outer face, which is in contact with a second fluid, which can be ambient air.

Membrane means any supple and tight film, such that the membrane forms a barrier between the fluid in the cavity and the fluid located on the opposite face of the membrane.

In the event where the optical device is a lens, which therefore functions in transmission, the membrane and the base of the cavity are transparent, at least in their central part, to an optical beam intended to propagate through the lens by successively passing through the central part of the membrane, the fluid and the base of the cavity.

In the event where the optical device is a mirror, the central part of the membrane and/or of the base is reflecting.

The fluid is sufficiently incompressible to move towards the central part of the device when force is applied to a membrane in the direction of the fluid, this force being applied in an intermediate part between the anchoring area and the central part of the membrane.

The membrane is capable of deforming reversibly, from a rest position (which can be planar or not), under the action of such displacement of the fluid, which varies the thickness of fluid at the level of the central part of each membrane.

The shape of the support and of the membrane can advantageously have a shape of revolution about the optical axis of the optical device, but those skilled in the art could select any other shape without as such departing from the scope of the present invention.

The membrane is provided with an actuation device of an area located between the peripheral anchoring area and the central part.

Said actuation device is configured to bend by application of electrical actuation voltage so as to move some of the volume of fluid located in a region, so-called flow region, located between the actuation area of the membrane and the base of the cavity.

Those skilled in the art know different actuation devices utilisable to actuate membranes.

These devices are based on different technologies, examples of which are piezoelectric actuation, electrostatic, electromagnetic, thermal actuation or even based on electro-active polymers.

In this respect reference could be made to such actuation devices in documents FR2919073, FR2950154 and FR2950153.

The choice of actuation technology and dimensioning of the actuation device depends on expected performance levels (for example, electrical consumption), stresses to which it will be subjected during operation of the device, and considerations relative to the electrical actuation voltage to be applied For example, an actuation device particularly adapted to creating a single direction of actuation is based on piezoelectric technology.

It is recalled that a piezoelectric actuator comprises a block of piezoelectric material sandwiched totally or partially between two electrodes intended, when fed, to apply an electrical field to the piezoelectric material. This electrical field is used to control mechanical deformation of the block of piezoelectric material. The block of piezoelectric material can be monolayer or multilayer and extend beyond an electrode.

The actuation device can comprise a single actuator in the form of a crown or else several separate actuators (for example in the form of beams) distributed uniformly over the circumference of the membrane.

Optionally, the actuators can be capable of bending in two opposite directions.

The actuation device can be arranged on the inner face of the membrane, on the outer face or even inside the membrane.

Optionally, the actuation device can extend in part over the peripheral anchoring area.

In some embodiments, the base is a wall of the support and in contrast to the membrane is therefore substantially undeformable under the action of displacement of fluid in the cavity and of resulting variation in fluid pressure.

In other embodiments, the base of the cavity comprises a second deformable membrane, which can have physical, mechanical and dimensional properties identical or different to that of the membrane mentioned above. In this case, the fluid produces mechanical coupling of both membranes.

Also, said optical device comprises a heating element adapted to locally heat the fluid, said heating being located in the flow region and/or in the central part of the cavity, that is, the part of the cavity facing the central part of the membrane.

The localised heating of the fluid in fact decreases its viscosity in said flow region and favours flow of fluid towards the central part or towards the periphery of the cavity, depending on the direction of bending of the actuation device. The response time of the optical device is reduced. Similarly, localised heating of the fluid in the central part of the cavity favours flow of fluid in this region and consequently decreases the response time of the optical device.

The heating element advantageously comprises an ohmic conductor (commonly called "resistor") through which an electric current is passed.

The ohmic conductor is coupled to a control system which controls the intensity of the electric current circulating in the ohmic conductor or the electrical voltage at its terminals.

Joule effect produces a rise in temperature of said conductor and power P dissipated in the form of heat responding to the formula:

$$P = \frac{U^2}{R}$$

where U is the electrical voltage (in volts) applied to the terminals of the conductor and R is the value of the resistance (in ohms) of said conductor.

The thermal energy contributed by Joule effect over time $\Delta t$ is:

$$E_J = \frac{U^2}{R} \times \Delta t$$

The equations hereinabove correspond to control of the electrical voltage U applied to the terminals of the conductor.

In the event where it is the electric current I which is controlled by the control system, the power P is expressed as:

$$P = R \times I^2$$

where I is the electric current (in amperes) circulating in the conductor.

The thermal energy contributed by Joule effect over time $\Delta t$ is:

$$E_j = \frac{R \times I^2 \times \Delta t}{2}$$

The ohmic conductor can be integrated into the optical device according to different embodiments which are described in detail later.

The performance of the ohmic conductor depends on the material or materials which constitutes the latter and its geometry. In general, the aim is to optimise the materials and geometry of the ohmic conductor to produce rapid heating of fluid and minimise the electrical consumption of the optical device.

Alternatively, a Peltier module can be used in place of the ohmic conductor mentioned hereinabove to form the heating element.

Preferably, the heating element is positioned as closely as possible to the fluid in the flow region and/or in the central part of the cavity—for example in direct contact with the fluid, and has a sufficiently large surface to produce a thermal exchange surface with fluid as large as possible.

In the event where the response time of the optical device is satisfactory at ambient temperature, activation of the heating element can take place at low temperature only, when this temperature causes a significant drop in the viscosity of the fluid and consequently a drop in the response time of the device. Therefore, below a determined temperature threshold from which the response time of the device is no longer acceptable, the control system is triggered to heat the fluid and return the response time to an acceptable level. This control mode is advantageous in that it minimises the power consumed by the optical device. It is in fact only at low temperature that the heating element contributes to the electrical consumption of the optical device.

Alternatively, especially when the response time of the optical device is judged insufficient at ambient temperature, activation of the heating element can be systematic. In this case, the fluid is heated irrespective of the temperature to which the optical device is subjected, which lowers the viscosity of the fluid and improves the response time. The duration of the heating can depend on the use of the device.

Activation of the heating element can be carried out by pulses, at each actuation of the membrane. During the specified response time (typically of the order of 10 ms or even a few ms), the fluid is heated to facilitate its flow, then heating is stopped while the device is inactive, until the next actuation.

In the event where the heating element must be activated below a certain temperature threshold, there are several solutions for detecting the need to activate it:
- the temperature can be measured by a sensor which can be an ohmic conductor dedicated to this measuring in the optical device or else a temperature sensor located outside the optical device;
- the temperature can be measured by the heating element itself by a technique known to those skilled in the art (so-called four-point method);
- a characteristic of the optical device can be measured at rest (without actuation), if said characteristic (for example the focal length, the electric current at the terminals of the actuation device) is influenced by temperature,
- a characteristic (for example the focal length) of the optical device can be measured after a certain actuation time and compared to an expected value: if the measured focal length is of the order of the expected focal length, the device has a sufficiently rapid response time and it is not necessary to heat the fluid. If the focal length is less than a determined threshold, this means that the heating element has to be activated (the intensity of the current having for passing through the ohmic conductor can be tied to the expected focal length value). As mentioned in the preceding paragraph this principle can be applied to another characteristic of the optical device, such as the current at the terminals of the actuation device;
- another method consists of using the optical device once without heating (for example, by letting the focussing sequence happen) and, if the result is not at the expected level, activating the heating element.

Irrespective of the mode of detection used, if heating is not continuous, the control system of the heating element functions according to an adapted algorithm. Developing this algorithm is within the scope of those skilled in the art.

FIG. 1 illustrates a first embodiment of the invention.

The optical device 100 comprises a support 2 having a recessed shape defining a cavity comprising a base 20 and a lateral wall 21 extending from the base.

The support can optionally comprise a stack of layers so that the material of the wall 21 is not necessarily the same as that of the base 20.

For example, the substrate 2 can be made of glass.

The deformable membrane 100 has a peripheral area 1c by which it is sealingly anchored on the support 2.

With the base 20 and the wall 21, the membrane defines a sealed cavity filled with a constant volume of fluid 3.

The device 100 further comprises an actuation device (not illustrated) arranged in the actuation area 1a of the membrane which is located between the anchoring area 1c and the central part 1b of the membrane.

At rest, that is, when no electrical voltage is applied to the actuation device, the membrane 1 is supposed to be planar (configuration shown in dots). However, this illustration is not limiting and the membrane can have a non-planar configuration at rest (for example to form a convergent or divergent dioptre) without as such departing from the scope of the present invention.

The configuration of the membrane shown in solid lines corresponds to a non-limiting example of deformed configuration of the membrane under the effect of application of electrical voltage to the actuation device.

In fact, application of said electrical voltage causes bending of said actuation device towards the fluid 3, as indicated by the two arrows.

The effect of this bending is to force some of the fluid located in the region 30 between the actuation area 1a and the base 20 (called flow region, which is delimited in FIG. 1 by dots) to flow away towards the centre of the cavity. At the same time, the fluid pressure exerted on the central part 1b of the membrane rises, causing its deformation.

The deformed configuration illustrated here is one non-limiting example only and other deformations of the membrane are feasible as a function of the range and direction of bending of the actuation device.

The base 20 of the cavity is covered by a heating element 5 which has, in this embodiment, the form of a disc, as illustrated in a plan view according to A-A.

The heating element extends at least as far as the outer edge of the flow area 30, so as to heat the fluid 3 at the same time in the flow area 30 and in the central part of the cavity.

In other terms, the heating element in this case has the same geometry as the entire central part 1b and actuation area 1a of the membrane.

In the event where the optical device operates in transmission and the heating element is located in the optical field of the device, the heating element is made of a material or materials transparent to the specified wavelength. For example, indium tin oxide can be used (ITO or "Indium Tin Oxide"), which is an electrically conductive material transparent in the visible field.

Figure 2:
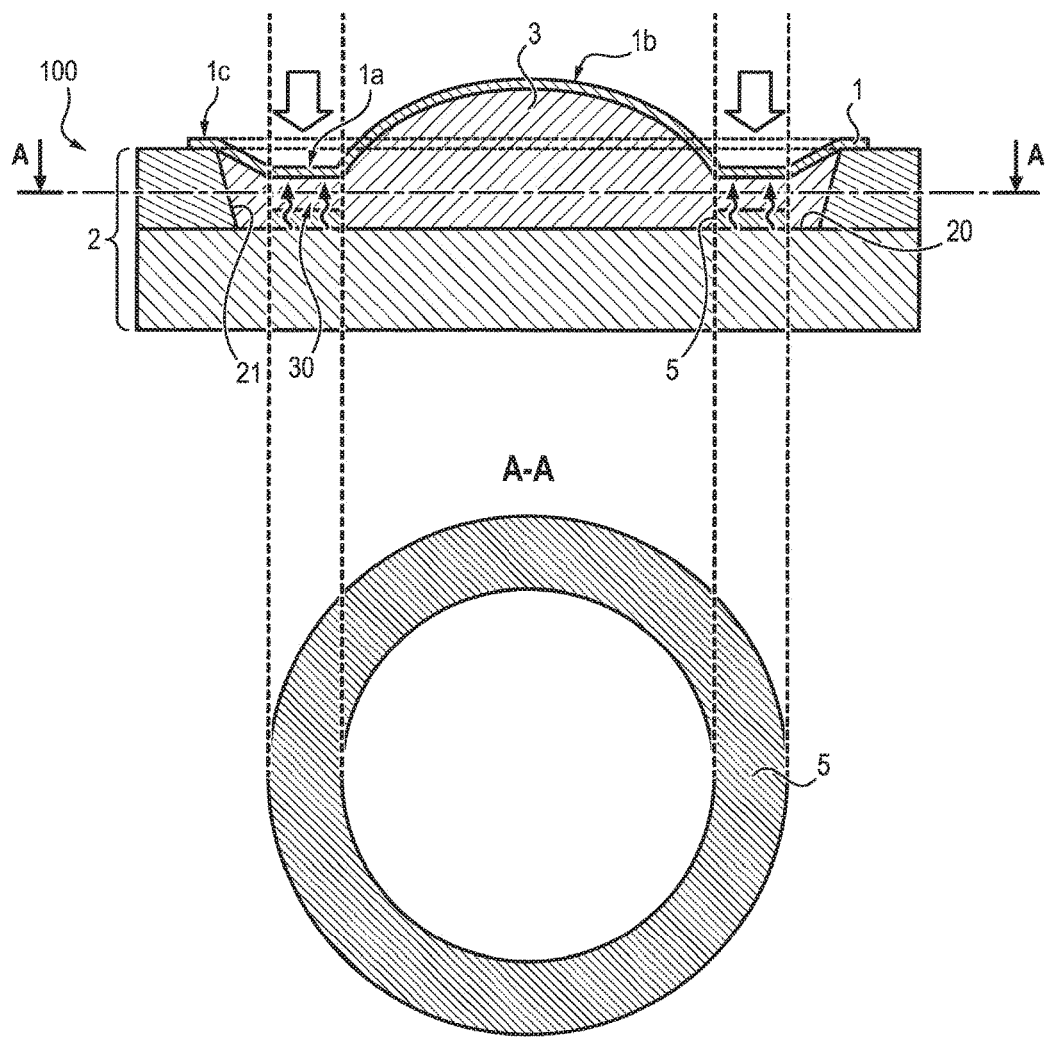
FIG. 2 is a sectional view of an optical device according to an embodiment in which the heating element has an annular shape and is arranged on a region of the base of the cavity facing the flow region.

FIG. 2 illustrates an embodiment of the device 100 in which, different from the device illustrated in FIG. 1, the heating element 5 has an annular shape. The other characteristics of the device 100 are similar to those of the device of FIG. 1 and are therefore not described in further detail.

Advantageously, the width of the heating element 5 is at least equal to the width of the actuation area 1a of the membrane. The inner diameter of the heating element 5 is preferably selected so as to be less than or equal to the inner diameter of the flow area 30 and the outer diameter of the heating element 5 is selected so as to be greater than or equal to the outer diameter of the flow area 30. It is however possible to select a heating element which would be not as wide as the actuation area, or which would be partially offset relative to the actuation area.

Therefore, the fluid 3 is heated locally, in the flow region 30 and optionally near the latter.

Locating the heating where the flow of the fluid is most critical acts directly on some of the fluid whereof the viscosity most substantially influences the response time, all the more so since the fluid generally has limited thermal conductivity. Localised heating at the level of the region of displacement of the fluid therefore prevents heating the rest of the device and boosts efficacy in terms of power required for heating the fluid.

Figure 3:
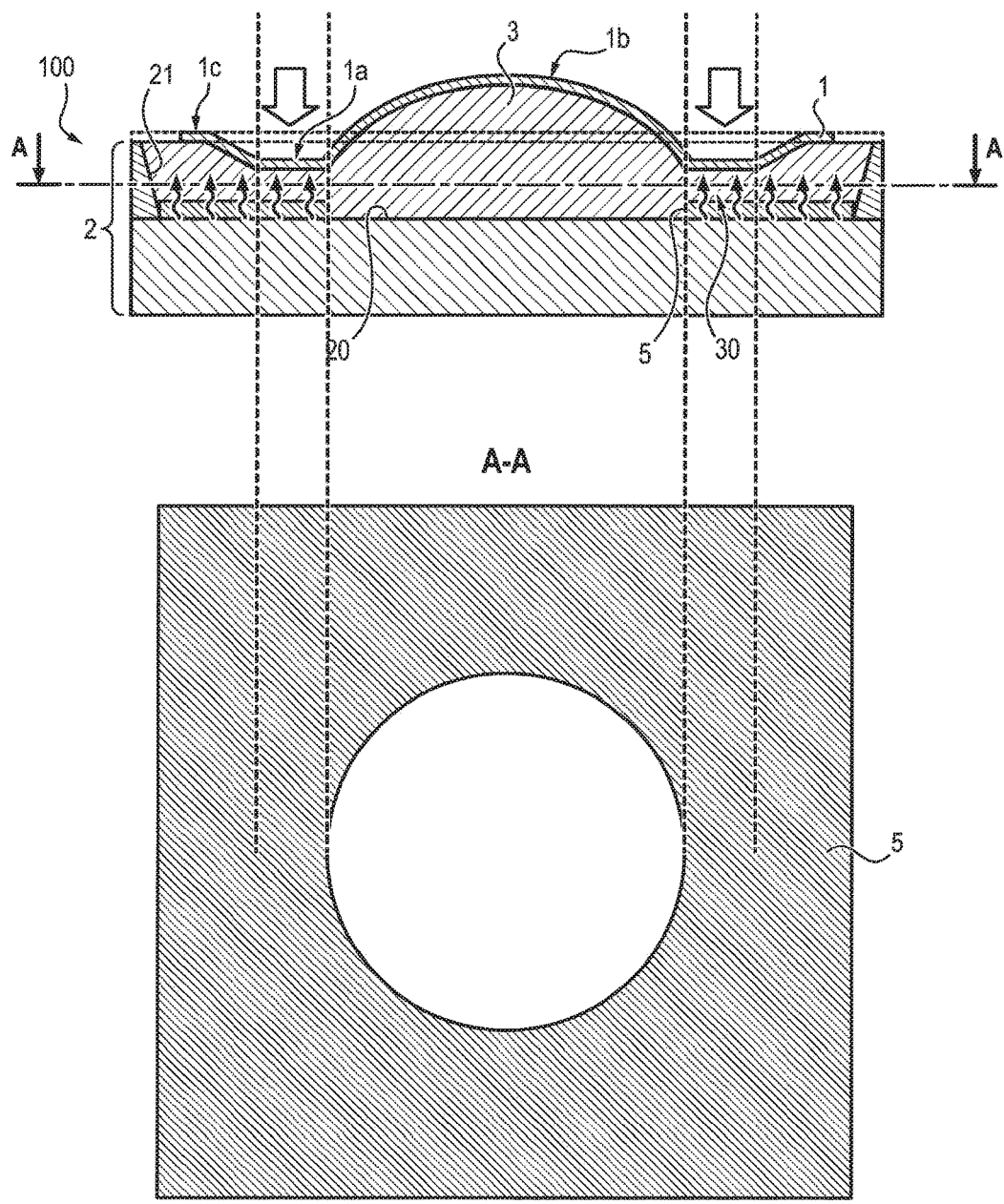
FIG. 3 is a sectional view of an optical device according to a variant of FIG. 2.

FIG. 3 illustrates a variant of the embodiment of FIG. 2, in which the heating element 5 has a rectangular outer contour and a circular inner contour. The other characteristics of the device 100 are similar to those of the device of FIGS. 1 and 2 and are therefore not described in further detail.

In this case, the inner edge of the heating element coincides with the periphery of the optical area of the device, such that the heating element is not interposed on the path of the light beam, while the outer edge of rectangular shape increases the thermal exchange surface with fluid relative to the heating element of FIG. 2.

Figure 4:
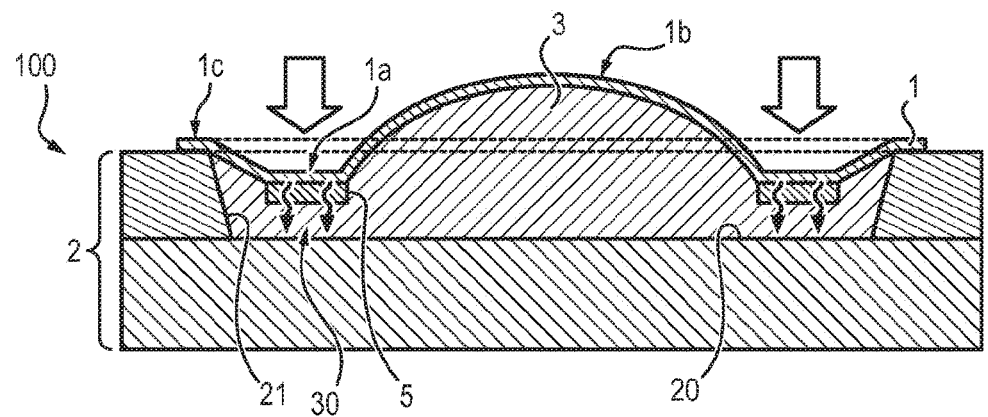
FIG. 4 is a sectional view of an optical device according to an embodiment in which the heating element is arranged in the actuation area of the membrane, on the face in contact with the fluid in the flow region.

FIG. 4 illustrates an embodiment of the optical device in which the heating element is arranged in the actuation area of the membrane, on the face in contact with the fluid in the flow region.

The heating element therefore has annular geometry, as in FIG. 2.

On the other hand, since the heating element is in direct contact with the fluid of the flow region, thermal losses are minimised.

Figure 5:
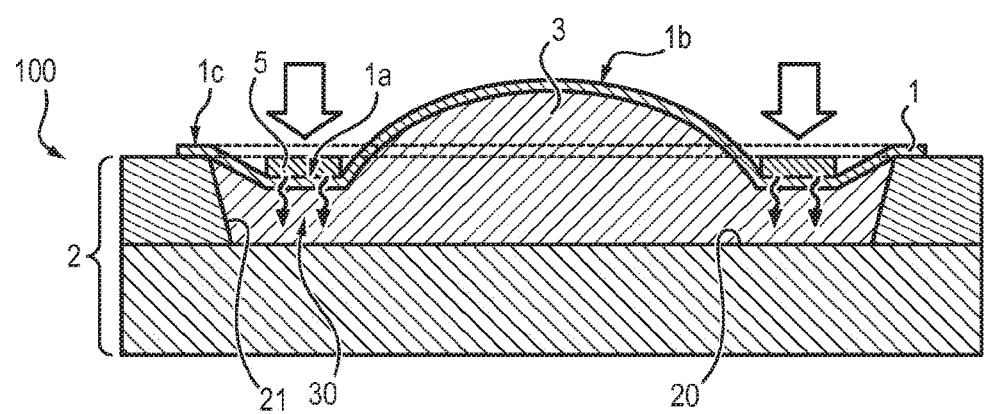
FIG. 5 is a sectional view of an optical device according to a variant of FIG. 4 in which the heating element is arranged in the actuation area of the membrane, on the face opposite the fluid.

FIG. 5 illustrates a variant of the optical device of FIG. 4 in which the heating element 5 is arranged in the actuation area 1a of the membrane, on the face opposite the fluid.

Figure 6:
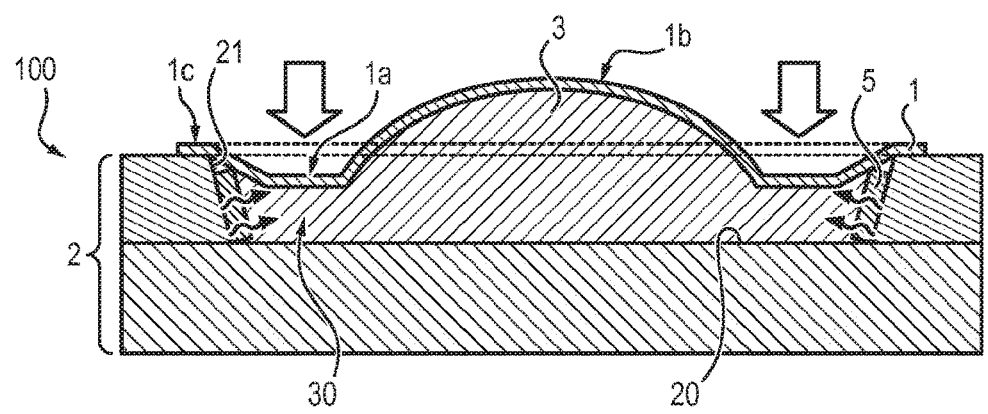
FIG. 6 is a sectional view of an optical device in which the heating element is arranged on a wall of the cavity extending between the base and the membrane.

FIG. 6 illustrates an embodiment of the optical device in which the heating element is arranged on the wall of the cavity 21 which extends between the base 20 and the membrane 1. The heating element has the geometry of a crown which extends over all or part of the height of the wall 21.

To the extent where the flow region 30 is relatively close to the wall 21, thermal conduction through the fluid can be sufficient to heat the fluid in the region 30.

Also, it is also possible for the heating element to form part of the actuation device of the membrane.

Figure 20:
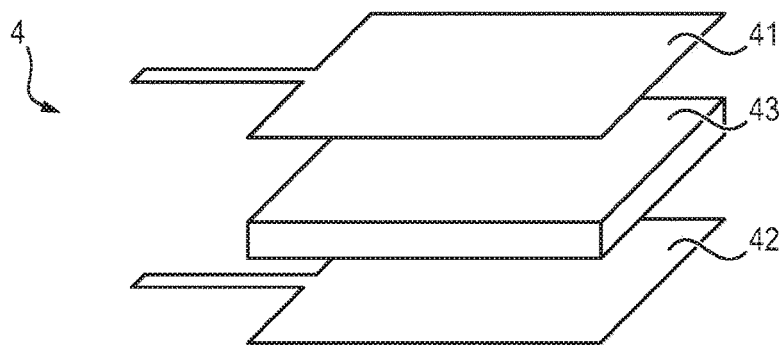
FIG. 20 is an exploded schematic view of a conventional piezoelectric actuation device.

In the case of piezoelectric actuation, the base components of the device are a piezoelectric layer and two electrodes stacked on either side of said layer (cf. FIG. 20). The application of voltage between the two electrodes causes contraction or extension of the piezoelectric material in the plane of the layer. To achieve deflection out of this plane, the device must comprise other components which can be passive (such as mineral or metallic materials, for example) or active (such as piezoelectric components). These additional different components influence actuation, according to their thickness, their Young's modulus, their residual stress, their position relative to the neutral fibre of the stack.

"Forming part of the actuation device" in the present text means that the heating element can be a component which participates in deflection and force engendered by application of voltage to actuation and/or a component which participates in the mechanical balance of the actuation device at rest (especially a component which contributes to controlling the position at rest of the actuation device) and/or a component which adjusts the effect of the actuation device at rest on the strain in the membrane.

For example, in the case of a piezoelectric actuation device the ohmic conductor forming the heating element can be an element arranged near the stack piezoelectric intended to balance the stresses in the stack and control the position at rest. In this case, the heating element can be positioned on the membrane, on the same face as the actuation device or on the face opposite the actuation device.

Figure 7:
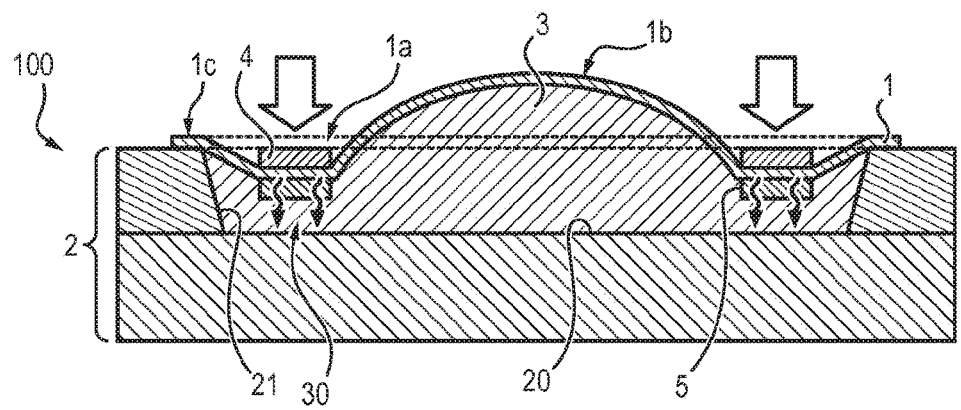
FIG. 7 is a sectional view of an optical device according to an embodiment in which the heating element forms part of the actuation device of the membrane.

FIG. 7 illustrates an embodiment of the optical device in which the heating element 5 is positioned in the actuation area 1a of the membrane, on the face opposite the actuation device 4. This arrangement has the advantage of electrically insulating the heating element relative to the electrodes of the actuation device of the membrane.

On the thermal plane, it is advantageous to maximise the thermal exchange surface between the heating element and the fluid.

Figure 8:
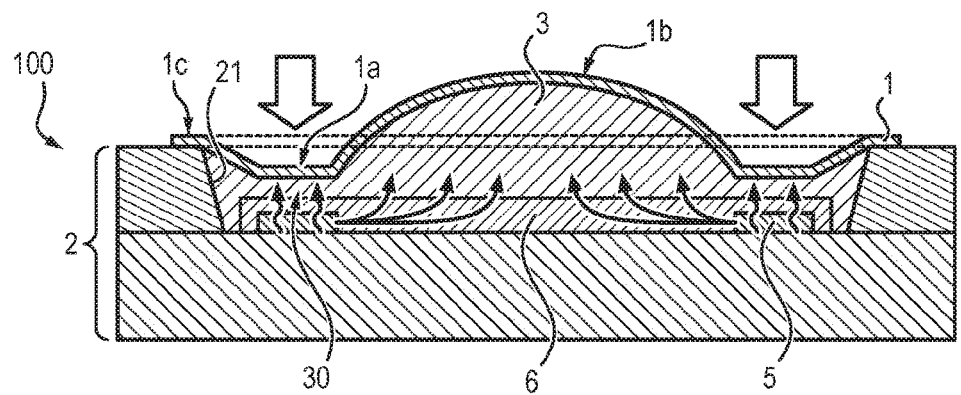
FIG. 8 is a sectional view of an optical device according to an embodiment in which a heat-diffusion element extends between the fluid and the heating element.

According to an embodiment of the invention illustrated in FIG. 8, the optical device comprises a heat-diffusion element 6 extending between the fluid 3 and the heating element 5. The element 6 is made of material thermally more conductive than the support 2, such as copper, silver, or DLC (Diamond Like Carbon) if considerations of optical transmission are to be considered.

For example, the heating element 5 has an annular shape such as illustrated in FIG. 2, but the heat-diffusion element 6 has a surface larger than that of the heating element.

Therefore, the heat dissipated by the heating element 5 is diffused within the element 6 and distributed by means of the latter to a larger fluid surface, enabling heating of the fluid located in the central part of the cavity.

In the event where the optical device operates in transmission and the element 6 is located in the optical field of the device, material transparent to the specified range of wavelength is selected for said element 6.

Figure 9:
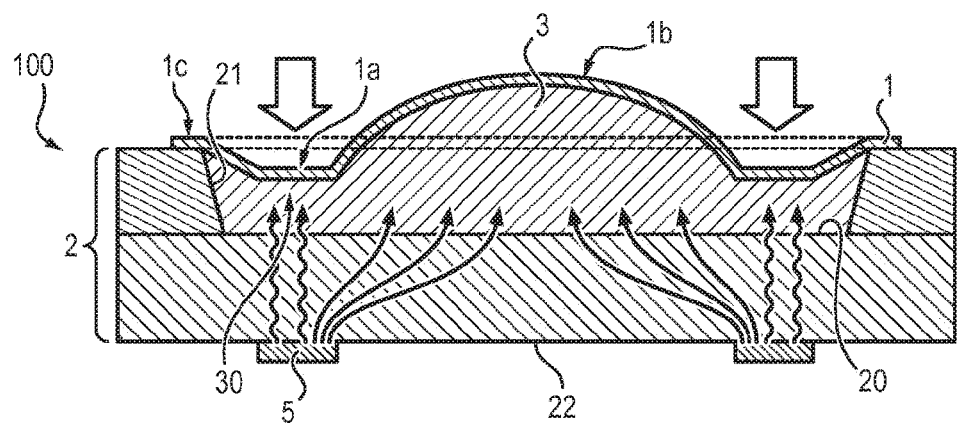
FIG. 9 is a sectional view of an optical device according to an embodiment in which the heating element is arranged on a face of the support opposite the base of the cavity.

FIG. 9 illustrates an embodiment of the optical device in which the heating element 5 is arranged on a face of the support 2 opposite the base 20 of the cavity, facing the flow region 30.

This solution is likely to be less efficacious, especially in terms of heating kinetics, but according to the nature of the support (for example if it is made of glass), the heat dissipated by the heating element 5 diffuses through the support 2 and is distributed over a surface larger than that of the heating element itself.

Figure 10:
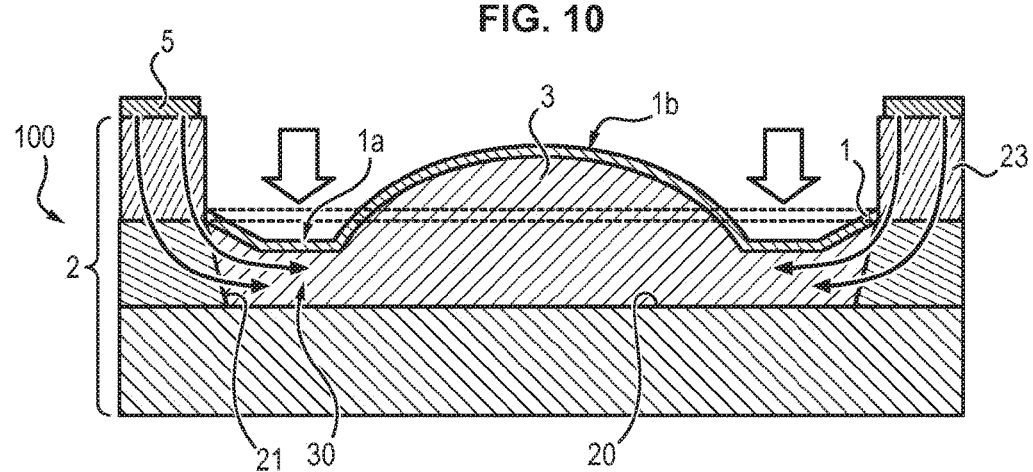
FIG. 10 is a sectional view of an optical device according to an embodiment in which the heating element is arranged on part of the support extending beyond the anchoring area of the membrane.

FIG. 10 illustrates another embodiment of the optical device in which the heating element 5 has an annular shape and is arranged on a substrate 23 stuck to the face of the support 2 on which the membrane 1 is anchored. Said substrate 23 is made of thermally conductive material such that the heat dissipated by the heating element 5 diffuses through the substrate 23 and of the support 2 and enables heating of the fluid at the level of the wall 21 and in the flow region.

To heat fluid, it can be advantageous to place the heating element in direct contact with the fluid and insulate said heating element from the exterior of the optical device.

Depending on thermal resistivity of the various components of the optical device, the placement and geometry of the heating element can be adapted according to the modalities described hereinabove.

The considerations relative to manufacturing the optical device can also be considered.

For example, using microsystem technologies can be advantageous for positioning the heating element on the membrane to simplify its manufacture.

Therefore, the membrane can fulfil an electrical insulation function between the heating element and the actuation device. This prevents having to add a specific electrically insulating layer.

It can be also wise to thermally insulate fluid from the outer, for example by including in the device a thermally insulating layer or layers around the cavity containing the fluid.

Similarly, it can be advantageous to include in the optical device a thermally insulating layer or layers around the heating element to insulate the latter from the exterior.

Figure 11:
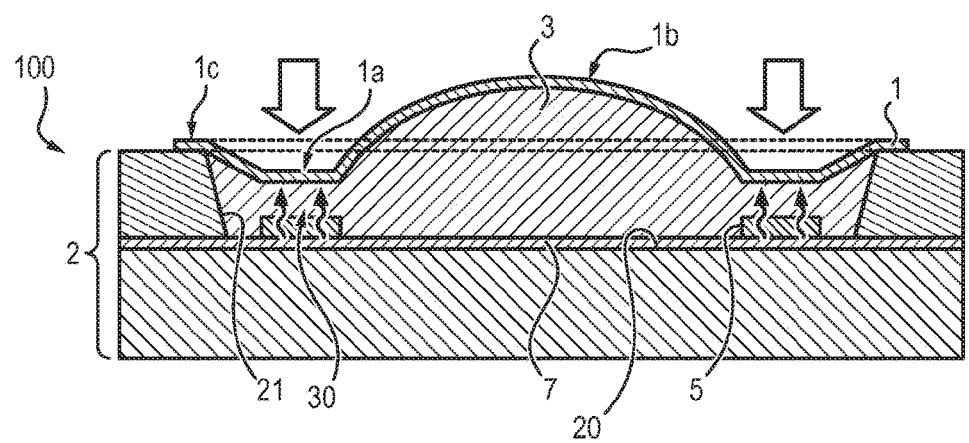
FIG. 11 is a sectional view of an optical device according to an embodiment in which a thermal insulation element is arranged between the heating element and the support.

FIG. 11 illustrates an embodiment in which a layer 7 of thermal insulation is arranged on the base 20 between the heating element 5, which is of annular shape, and the support 2. Said layer 7 prevents thermal losses of the heating element 5 towards the exterior of the optical device. The layer 7 can comprise mineral material such as $SiO_2$, SiN, $Al_2O_3$ or a polymer material.

The different embodiments described hereinabove can optionally be combined by those skilled in the art as a function of the configuration of the optical device and expected performances.

Focus will be placed hereinbelow on the dimensioning of the cavity and heating element to create an effective response time.

In the case of an optical device whereof the response time degrades at low temperature, the main aim is to keep the viscosity of the fluid in the flow region and/or in the central part of the cavity sufficiently low at low temperatures (typically −10 or even −20° C.) to ensure an effective response time relative to ambient temperature, typically 20° C. To ensure operation in response time at −10° C. substantially equivalent to nominal operation of the device at 20° C., the fluid has to be heated to raise its temperature from 30° C.

The thermal energy to be imparted to the fluid is proportional to the fluid mass m (kg), to its specific heat $c_s$ (J/kg/K) and to the preferred difference in temperature $\Delta T$ (K):

$$E = c_s \times \Delta T \times m$$

The fluid mass is defined by the volume V ($m^3$) of fluid contained in the cavity multiplied by its volume mass $\rho$ (kg/$m^3$). The volume of fluid is equal to the surface S of the optical device multiplied by the depth p of the cavity (presupposing that the cavity is simple in shape, as in FIG. 1, the height of the cavity is considered as equal to the distance between the membrane 1 in its rest position and the base 20), resulting in the equation:

$$E = c_s \times \Delta T \times \rho \times S \times p$$

To minimise required power, fluid having low specific heat $c_s$ and low volume mass $\rho$ should be selected.

Once the fluid is selected, power can be minimised by reducing the volume of fluid in the cavity.

The surface is generally defined by an optical surface (useful area optically corresponding generally to the central part of the membrane) and a surface dedicated to actuation (actuation area of the membrane for varying focal length).

This surface is a characteristic of the optical device, such as useful optical opening and variation in focal length.

For a given optical device, the depth of the cavity can be adjusted to minimise required power. It is noted that the less the cavity depth, the more the required power is minimised.

Figure 12:
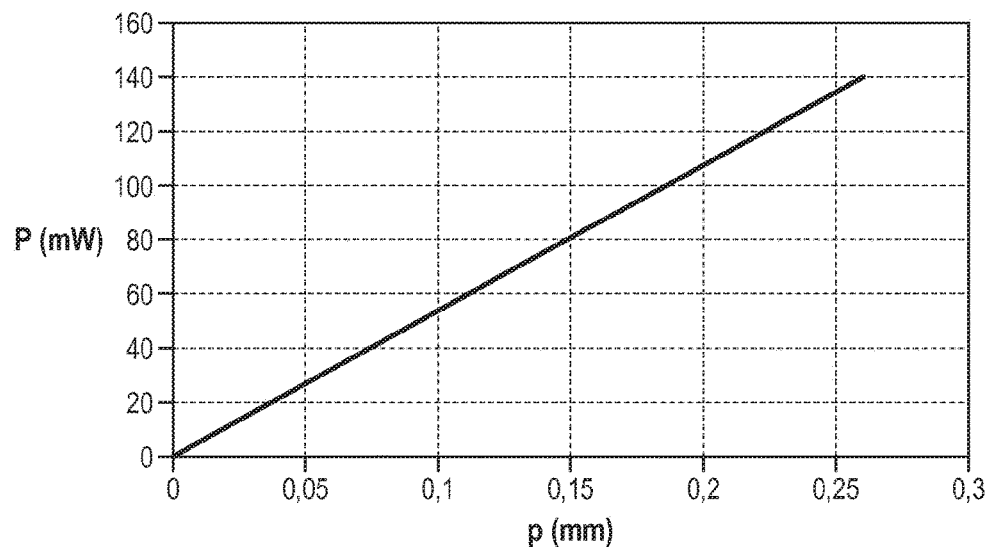
FIG. 12 is a curve illustrating the power P (in mW) as a function of the depth p (in mm) of the cavity containing the fluid.

FIG. 12 is a curve illustrating power P (in mW) to raise the temperature of the fluid by 30° C. over 1 s as a function of the depth p (in mm) of the cavity containing the fluid, given a cavity of 4 mm in diameter and fluid having the following properties:

Cs=950 J/kg/K
$\rho$=1.5 kg/$m^3$.

The power calculated in this way corresponds to an ideal case where the fluid is completely insulated from the exterior.

As a function of the materials making up the device and the thermal exchange conditions between the device and the exterior (convection, radiation, conduction . . . ) and associated thermal losses, the power required can be revised upwards.

More detailed calculation or even simulations (by finished elements under ANSYS for example) can prove necessary.

Irrespectively, the tendency of the influence of cavity depth (fluid thickness) on the power required remains valid such that to gain effectiveness and minimise power consumed by the heating element, it is an advantage to minimise cavity depth.

However, at ambient temperature, cavity depth has a beneficial effect on response time. In fact, the greater the depth, the more rapid the response time.

It is therefore necessary to find a compromise between cavity depth sufficient to create a satisfactory response time of the device at ambient temperature but not too great so as not to jeopardise electrical consumption required at low temperature for heating fluid in the flow region and/or in the central part of the cavity and maintain a satisfactory response time.

In the example detailed hereinabove, the compromise in terms of depth is between 50 μm and 200 μm typically with required power of 27 mW at 107 mW respectively.

The power required for heating fluid (and maintaining response time at low temperature in an acceptable range) must therefore be in phase with the specified application and effective consumption of the device as an operation (associated with actuation).

Once sizing is complete as such (defined fluid height/cavity depth), those skilled in the art can design the adapted heating element.

Knowing the power required, in the case of an ohmic conductor, the resistance can be determined as a function of current or electrical voltage to be applied. For example, if the aim is to control the heating element with electrical voltage variable up to 10V, the minimal resistance required is 3720Ω (for cavity depth of 50 μm) and 931Ω (for cavity depth of 200 μm).

The material of the heating element must be selected for its electrical conductivity, its processing capability and optionally its transparency in the preferred wavelength range (for a device operating in transmission where the heating system is also present in the useful optical area).

For example, copper is a good electrical conductor (electrical conductivity $\sigma=5.96\times10^7$ S/m) whereas nickel and platinum are more resistive (respective electrical conductivity of $\sigma=1.43\times10^7$ S/m and $\sigma=9.66\times10^6$ S/m).

Since the materials cited are not transparent in the visible field, it is advantageous to place the heating element at the periphery of the optical field.

Indium tin oxide (ITO) can be utilised as ohmic conductor transparent in the visible field.

As a function of the geometry of the optical field and of the outer dimension of the device, there is a certain surface for the heating element. For example, for an optical field of diameter 2 mm and an optical device of 6 mm per side, there is a maximum surface of 32.9 mm² (as in FIG. 3 not counting the periphery of the cavity). In the event where the aim is to limit the area where the heating element is positioned to as crown of 4 mm in diameter for example (as in FIG. 2), the surface dedicated to the heating element is 9.4 mm².

To optimise performances of the heating element, it is advantageous to maximise the surface occupied by the ohmic conductor in the area where the heating element is positioned. For this, the entire surface can be covered by an ohmic conductor (cf. FIG. 13A), or else the ohmic conductor can be given a coil shape (cf. FIG. 13B). In these two figures, the markers 5a and 5b designate the terminals of the heating element 5. The rectangular contour shown in dots designates the area occupied by the heating element, or heating area.

Combining the form of the ohmic conductor of the type of that illustrated in FIG. 13A or FIG. 13B and the different geometries presented hereinabove enables many technical solutions.

FIGS. 14A to 18 illustrate different examples.

Figure 14A:
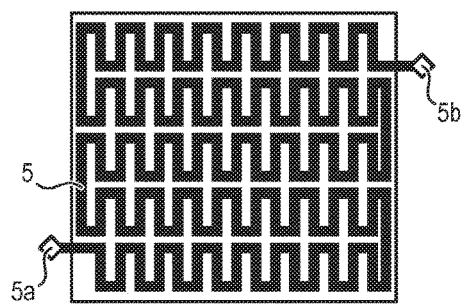
FIGS. 14A and 14B illustrate two examples of arrangement of a heating resistor in coil form on a rectangular surface.
Figure 14B:
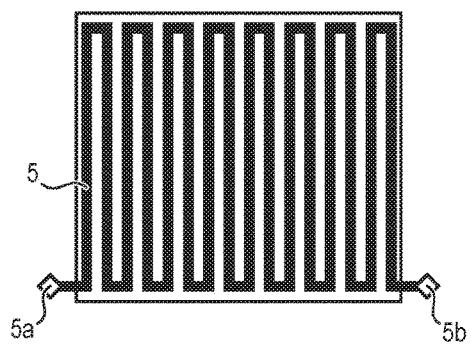
Figure 15A:
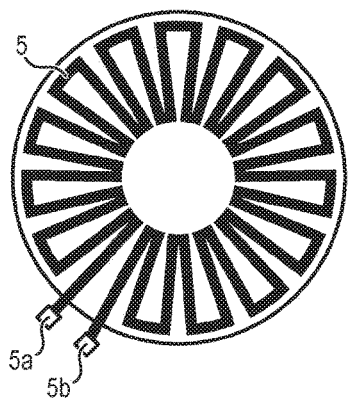
FIGS. 15A and 15B illustrate two examples of arrangement of a heating resistor in coil form on a circular surface.
Figure 15B:
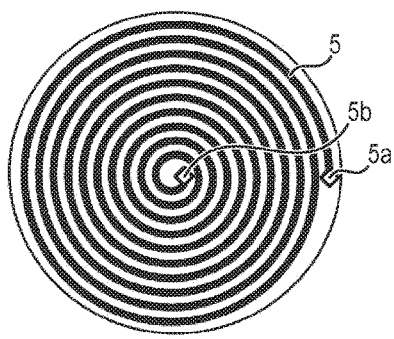
Figure 16A:
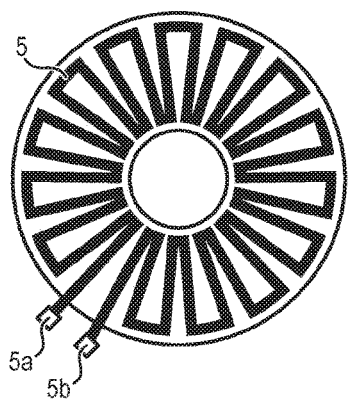
FIGS. 16A and 16B illustrate two examples of arrangement of a heating resistor in coil form on an annular surface.
Figure 16B:
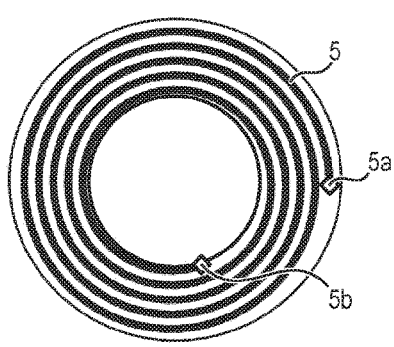
Figure 17:
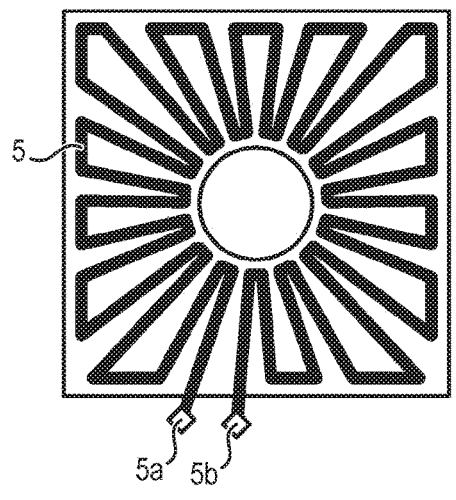
FIG. 17 illustrates an example of arrangement of a heating resistor in coil form on a rectangular surface recessed in its centre.
Figure 18:
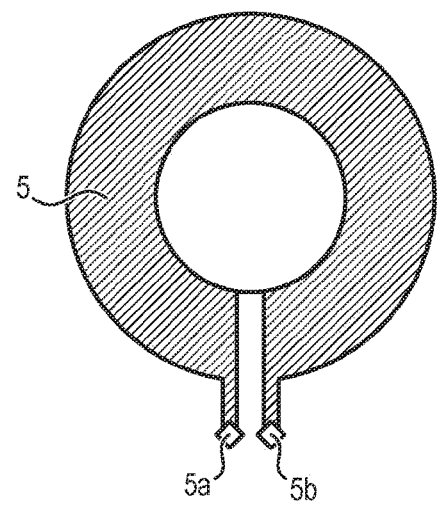
FIG. 18 illustrates an example of heating resistor extending continuously over an annular surface.

FIGS. 14A-14B show two configurations of ohmic conductor in coil form arranged on a rectangular or square surface; FIGS. 15A-15B illustrate two configurations of ohmic conductor in coil form arranged on a surface in the form of a disc; FIGS. 16A-16B illustrate two configurations of ohmic conductor in coil form arranged on an annular surface; FIG. 17 illustrates a possible configuration of an ohmic conductor in coil form arranged on an annular surface whereof the inner edge is circular and the outer edge is rectangular or square; FIG. 18 illustrates an ohmic conductor in the form of a full layer on an annular surface.

It is clear that the end of the ohmic conductor positioned inside the heating area (FIGS. 15B and 16B) can be guided to the exterior by having it make a semi-revolution to the ohmic conductor at the level of the inside.

Figure 13A:
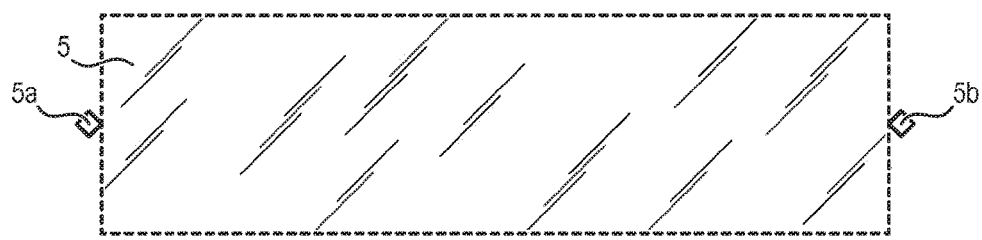
FIG. 13A is a drawing of the heating element comprising a heating resistor extending over a full surface.
Figure 13B:
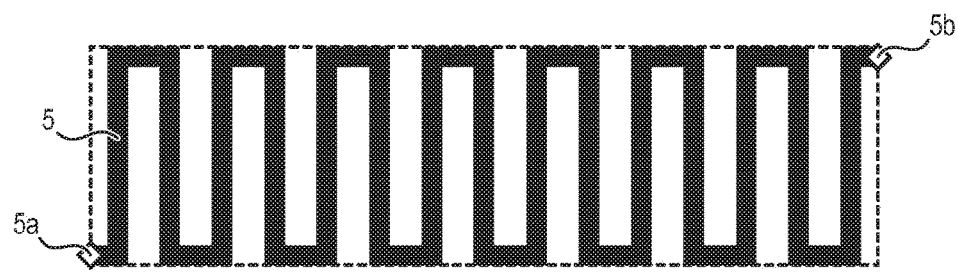
FIG. 13B is a drawing of the heating element comprising a heating resistor in coil form.

On the basis of a coil such as illustrated in FIG. 13B and by taking a resistor width equal to the insulation width, the surface occupied by the ohmic conductor is approximately half the surface of the heating area, or respectively 16.45 mm² (as in FIG. 3) and 4.7 mm² (as in FIG. 2). As a function of the manufacturing methods used, the resistor width and the insulation width can be adjusted to increase or decrease the surface occupied by the ohmic conductor.

To adjust the value of resistance, the first step can be to adjust the cross-section of the resistor. Minimising this cross-section also minimises the length of the ohmic conductor required to achieve the preferred value. For example, a resistor of thickness e=100 nm (classic thickness in the microsystem field) and width L=50 μm (easily achievable) can be used. In this case, the corresponding surface is equal to: $S=e\times L=5.10^{-12}$ m². By using the equation hereinbelow which connects the resistor, the electrical conductivity of the material, its length and the cross-section of the resistor, the associated resistor lengths can be calculated (see table below):

$$R = \frac{1}{\sigma \cdot S}$$

| | | Resistance (Ohm) | |
|---|---|---|---|
| | | 921 | 3720 |
| Length of the resistor (mm) | Cu | 274.5 | 1108.6 |
| | Ni | 65.9 | 266.0 |
| | Pt | 44.5 | 179.7 |

Given the width used for the resistor (50 μm) and available resistor surfaces (16.45 mm² in the case of FIG. 3 and 4.7 mm² in the case of FIG. 2), the maximal length of the ohmic conductor which can be placed in the heating area can be calculated, specifically 329 mm (as in FIG. 3) and 94 mm (as in FIG. 2).

Given the results presented in the table above, achieving the minimal required resistance of 3720Ω (for a cavity depth of 50 μm) requires using a resistor of Ni or Pt with a heating area extended over the entire surface of the optical device outside the optical field (as in FIG. 3). In fact, with an ohmic conductor length of 329 mm being available in this case, the 266 mm required for an ohmic conductor of Ni and the 179.7 mm required for an ohmic conductor of Pt can easily be placed.

To obtain the required minimal resistance of 931Ω (for a cavity depth of 200 μm), a resistor of Cu, Ni or Pt with a heating area extended to the entire surface of the device outside the optical field can be used (as in FIG. 3). The heating area can be limited to a crown of 4 mm in diameter, but using a resistor of Ni or Pt.

Another way to proceed, illustrated in FIG. 18, consists of covering the surface available for the heating area by an ohmic conductor in the form of a full layer as in FIG. 13A) and calculating the associated resistance, given the material used for the ohmic conductor and its thickness. In the case of FIG. 2 where 9.4 mm$^2$ are available, a resistor in crown form of width 1 mm and thickness 100 nm can be utilised. The resistances associated with this geometry are 1.58Ω for an ohmic conductor of Cu, 6.59Ω for Ni and 9.76Ω for Pt. These values are far lower than the resistances required for heating liquid with a voltage of 10V (931Ω for a cavity depth of 200 μm and 3720Ω for a cavity depth of 50 μm). Given these resistances, the liquid can be heated by adapting the control of the heating element. Electrical voltage of 0.41V is required for Cu, 0.84V for Ni and 1.02V for Pt. The electrical currents required are in this case greater, respectively 260 mA, 127 mA and 105 mA. Such a case is therefore more advantageous to controlling the heating element by current rather than electrical voltage, the values being low.

The choice between one and the other form of ohmic conductor (cf. FIG. 13A or FIG. 13B) is made as a function of the control provided for the heating element (voltage or current, range of intensity) and the resistance values to be achieved.

Figure 19:
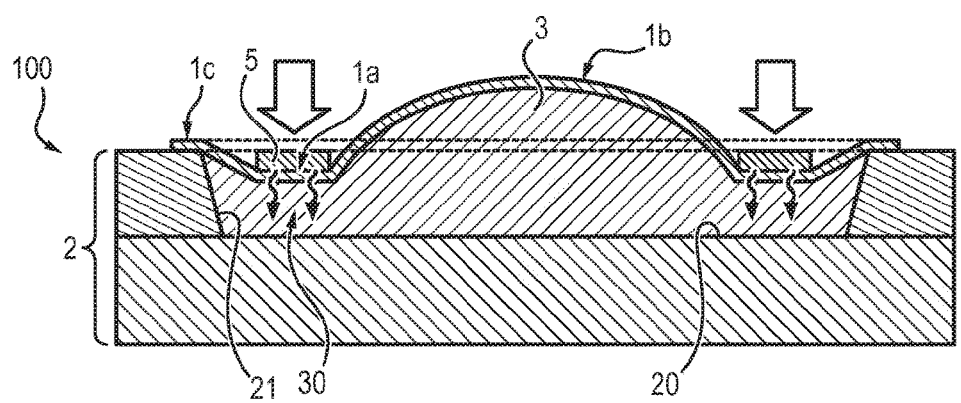
FIG. 19 is a sectional view of an optical device according to an embodiment in which the heating element is integrated into the actuation device of the membrane.

FIG. 19 illustrates a variant of the embodiment of FIG. 7 where the heating element is totally integrated into the actuation device of the membrane. In this example, the electrodes used in the piezoelectric actuation device (for example) can also serve as ohmic conductor. In this case, as many as two ohmic conductors can be integrated into the actuation device without adding extra manufacturing steps.

By way of reminder, FIG. 20 illustrates the core of a piezoelectric actuation device 4 of known type (specifically a layer of piezoelectric material 43 and the two associated electrodes 41, 42 without any bimorph(s)); to simplify the drawing, this device which has a crown shape is illustrated in linear form.

Each of the electrodes 41, 42 is brought to an equipotential respectively noted Vs and Vi. The difference in potential between the two electrodes (Vs−Vi) produces an electrical field in the piezoelectric material 43 which is at the origin of actuation.

Given the geometry of the actuation device in crown form, the corresponding ohmic conductor is illustrated in FIG. 16A.

Figure 21:
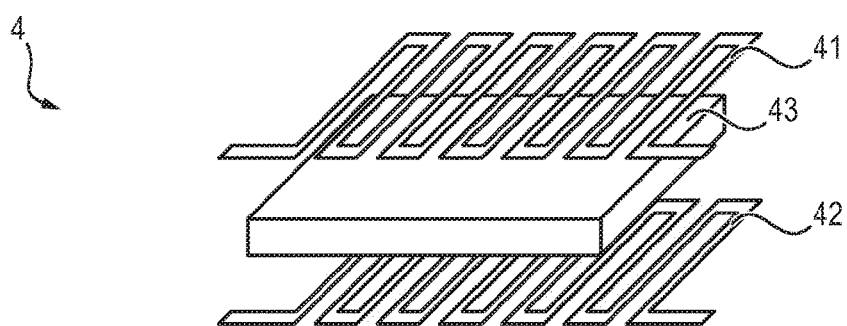
FIG. 21 is an exploded schematic view of a piezoelectric actuation device whereof the electrodes are heating resistors.

In the example illustrated in FIG. 21, the two electrodes 41, 42 satisfy the function of ohmic conductor.

None of the electrodes 41, 42 is any longer brought to an equipotential but is subjected to a difference in potential, respectively noted Vs1−Vs2 and Vi1−Vi2, which is intended to heat the ohmic conductor constituted by each electrode by Joule effect. Also, the difference in potential between the two electrodes (Vs1−Vi1 and Vs2−Vi2) is intended to produce an electrical field in the piezoelectric material and actuate the actuation device. To ensure uniform actuation, the difference in potential between the two electrodes must be uniform over the entire surface of the piezoelectric material and actuation device.

Figure 22:
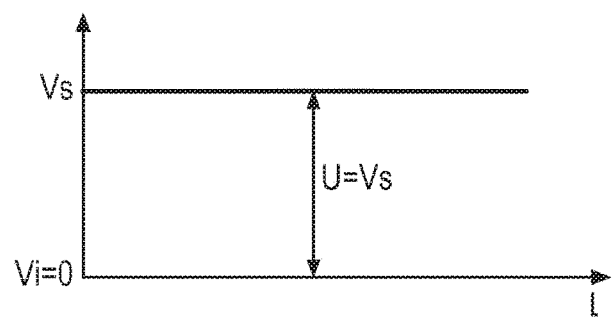
FIG. 22 presents the distribution of the difference in potential applied between the electrodes of a conventional piezoelectric actuation device over the length of the actuation area.

The difference U in potential between the electrodes along said electrodes is shown in FIG. 22 for an actuation device of known type; the upper electrode 41 is brought to the potential Vs and the lower electrode 42 is earthed (Vi=0).

Figure 23:
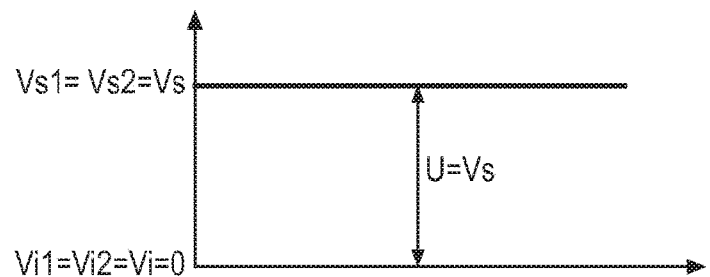
FIG. 23 shows the distribution of the difference in potential applied between the electrodes of a piezoelectric actuation device of the type of that of FIG. 21 when the heating element is not activated, the FIG. 24 shows the distribution of the difference in potential applied between the electrodes of a piezoelectric actuation device of the type of that of FIG. 21 when the heating element is activated.

FIG. 23 shows the distribution of the difference in potential U between the electrodes of a piezoelectric actuation device of the type of that in FIG. 21 when the heating element is not activated. In this case, the upper electrode 41 is brought to the equipotential Vs1=Vs2=Vs and the lower electrode 42 is earthed (Vi1=Vi2=0).

Figure 24:
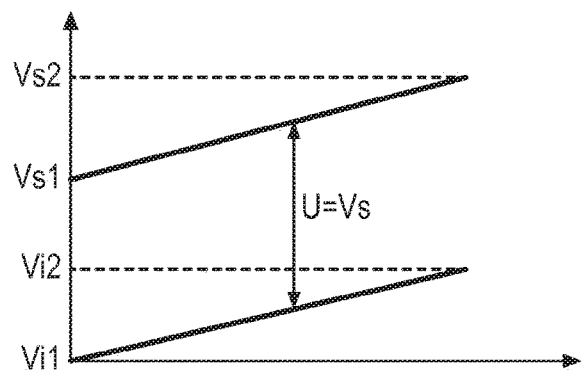

FIG. 24 shows the distribution of the difference in potential U between the electrodes of a piezoelectric actuation device of the type of that in FIG. 21 when the heating element is activated. In this case, the upper electrode 41 is subjected to a difference in potential between Vs2−Vs1 and the lower electrode 42 is subjected to a difference in potential between Vi2−Vi1, the difference in potential between the two electrodes being constant (U=Vs).

If the materials of the electrodes are different, this difference in potential can be ensured for example by independently adjusting the current in one and the other of the electrodes (in the event where resistance values are different), or by having the same current value run in the electrodes (in the event where resistance values are equal by adapting their geometries).

Other elements of the actuation device, such as bimorph layer(s) for example, can play a role in conjunction with the heating element (for example by satisfying the function of heat-diffusion layer or the function of insulation thermal of the heating element relative to the exterior).

Optionally, one of the two electrodes can play the role of temperature sensor.

The heating element and the elements optionally associated therewith can also ensure other functions in the optical device. Therefore, these elements can participate in actuation as in the example hereinabove or else allow integration of novel functions and especially an optical function such as an optical diaphragm. For example, for a device functioning in transmission, the notion of diaphragm consists of using the heating element (not transparent in the wavelengths specified in this case) to define the useful optical area of the device: in this case, typically a heating element such as illustrated in FIGS. 2 and 3 is selected, where passage of the optical incident beam is limited to the inner diameter. According to another example, for an optical device operating in reflexion, the heating element can also ensure reflexion of incident light: the heating element is then configured as a mirror.

In the embodiments described earlier, the base of the cavity is considered as a wall of the support, that is, a wall substantially undeformable under the action of displacement of fluid in the cavity and resulting variation in fluid pressure.

However, the invention also covers an optical device in which the base of the cavity comprises a second deformable membrane. In this case, the fluid exerts mechanical coupling of both membranes, which modulates deformations adopted by the central part of both membranes.

Figure 25:
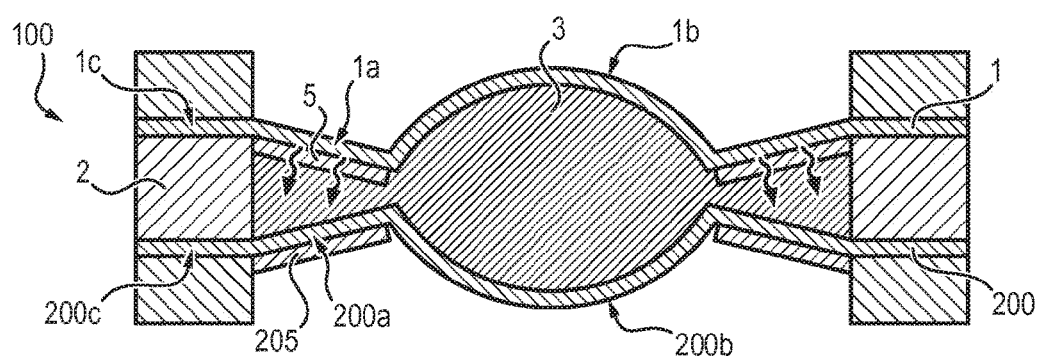
FIG. 25 illustrates an embodiment of the optical device comprising two deformable membranes coupled by the volume of fluid.

FIG. 25 illustrates an embodiment of the optical device 100 comprising an additional deformable membrane 200 connected to the support 2 by an anchoring area 200c.

The deformable membrane can itself be coupled not to an actuation device. In the embodiment illustrated in FIG. 25, the additional membrane 200 has an actuation device 205 arranged in an actuation region 200a located between the anchoring area 200c and the central part 200b of the membrane.

In this case, the heating element (not illustrated) advantageously forms part of one and/or the other of the actuation devices 5, 205 of both membranes. The heating element can for example have the same configuration as in the embodiment of FIG. 19.

Figure 26:
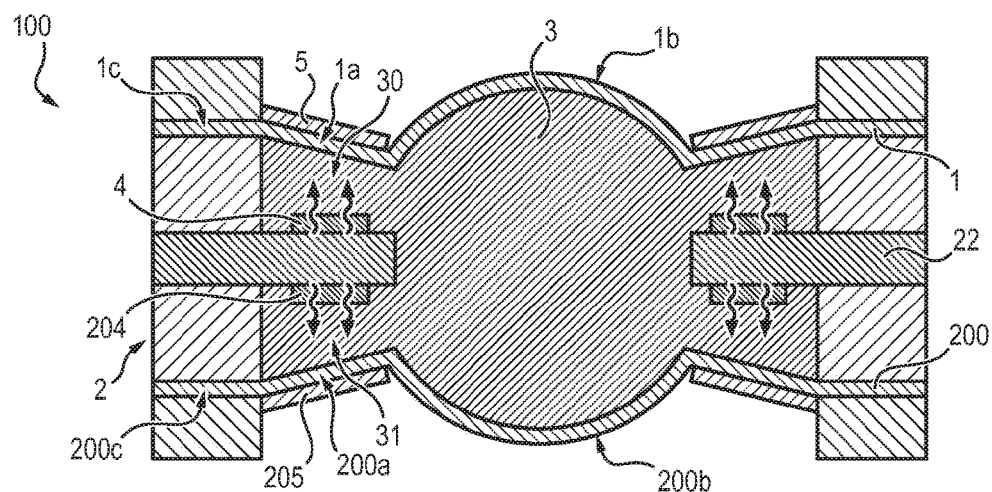
FIG. 26 illustrates a variant of the embodiment of FIG. 25 in which an intermediate support is interposed in part between the two membranes.

In another embodiment, illustrated in FIG. 26, a substrate 22 can be interposed in part between the membranes 1, 200. Said substrate 22 has a crown shape and extends radially towards the inside of the cavity from the support 2.

As in the preceding embodiment, the additional membrane 200 is represented with an actuation device 205, but it could, according to a variant, not be actuatable.

The inner diameter of the crown formed by the support is for example slightly less than the inner diameter of the actuation devices 5, 205 of both membranes. In this case, the device comprises two flow regions: a first flow region 30 between the membrane 1 and the support 22 and a second flow region 31 between the additional membrane 200 and the support 22.

In this case, it can be advantageous to arrange two heating elements 4, 204 on each face of the substrate 22 in each flow region 30, 31. Said heating elements are for example of the same type as that illustrated in FIG. 2.

Said heating elements advantageously take into account geometric differences of flow regions associated with each membrane; for example, in the case illustrated in FIG. 26, the flow region 30 has a lesser thickness than the flow region 31.

Figure 27:
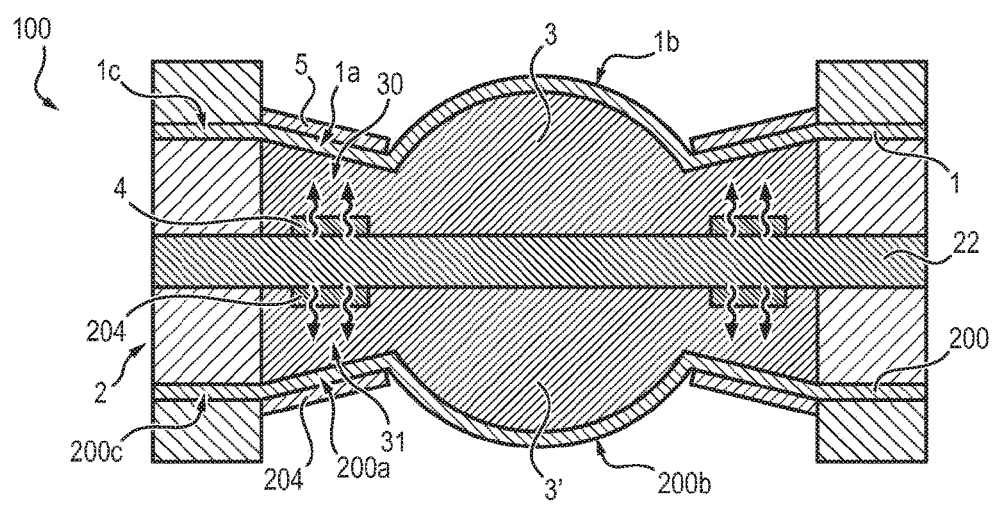
FIG. 27 illustrates an embodiment of the optical device comprising two deformable membranes each associated with a separate volume of fluid.

FIG. 27 illustrates an embodiment of the optical device comprising two deformable membranes 1, 200.

Each of the membranes is in contact with a respective volume of fluid 3, 3'.

The two volumes are separated by an intermediate substrate 22 which extends over the entire width of the cavity and are therefore independant of each other.

In this case, two heating elements 4, 204 are used advantageously to act on the respective flow region 30, 31.

For example, the heating elements can be arranged on either side of the intermediate substrate 22, in the respective flow region.

The optical device can be made using microelectronics techniques well known to those skilled in the art, especially techniques for thin-layer deposition such as vapour phase chemical deposition, vapour phase physical deposition, electrodeposition, epitaxy, thermal oxidation, evaporation, film lamination. Also, anchoring the membranes on the support may involve adhesion techniques.

The membrane can be made based on organic materials such as polydimethylsiloxane, polymethyl methacrylate, polyethylene terephthalate, polycarbonate, parylene, epoxy resins, photosensitive polymers, silicones, or mineral materials such as silicon, silicon oxide, silicon nitride, polycrystalline silicon, diamond carbon. The membrane can comprise a single layer of the same material or a stack of layers of different materials.

The fluid can be a liquid such as propylene carbonate, water, an index liquid, a optic oil or an ionic liquid, a silicone oil, an inert liquid with high thermal stability and low saturating vapour pressure.

The fluid can optionally be gas such as air, nitrogen or helium mainly for an optical device operating in reflexion.

If the optical device functions in transmission, those skilled in the art will select the refraction index of the fluid as a function of the preferred optical performances.

REFERENCES

FR 2 965 068

The invention claimed is:

1. An optical device, comprising:
a deformable membrane,
a support to which a peripheral anchoring area of said membrane is connected,
a cavity filled with a constant volume of fluid, said cavity being delimited by the membrane, a base extending substantially parallel to the membrane and a wall of the support extending between the base and the membrane,
an actuation device of an actuation area of the membrane located between the peripheral anchoring area and a central part of the membrane, configured to bend by application of electrical actuation voltage so as to move some of the volume of fluid located in a flow region located between the actuation area of the membrane and the base of the cavity,
said optical device comprising a heating element positioned and adapted to locally heat the fluid in the flow region to facilitate flow of the fluid in the flow region caused by bending of the actuation device.

2. The optical device according to claim 1, wherein the base of the cavity is a wall of the support.

3. The optical device according to claim 2, wherein the heating element is arranged on the base of the cavity.

4. The optical device according to claim 3, wherein a thermal insulation element is interposed between the heating element and the base of the cavity.

5. The optical device according to claim 3, wherein the heating element is arranged on a region of the base facing the flow region.

6. The optical device according to claim 2, further comprising a thermal insulation element between the heating element and the support.

7. The optical device according to claim 1, wherein the base of the cavity comprises an additional deformable membrane.

8. The optical device according to claim 1, wherein the heating element is arranged in the cavity, in contact with the fluid.

9. The optical device according to claim 1, wherein the heating element is arranged on or under the actuation area of the membrane.

10. The optical device according to claim 1, wherein the heating element forms part of the actuation device of the membrane.

11. The optical device according to claim 10, wherein the actuation device of the membrane is a piezoelectric device comprising a stack of a piezoelectric layer and at least two electrodes arranged on either side of the piezoelectric layer and in that at least one of said electrodes constitutes the heating element.

12. The optical device according to claim 1, wherein the heating element has an annular form facing the actuation area of the membrane.

13. The optical device according to claim 1, wherein the heating element is arranged on the wall of the cavity extending between the base and the membrane.

14. The optical device according to claim 1, wherein the heating element is transparent to at least one wavelength of the visible field.

15. The optical device according to claim 1, further comprising a heat-diffusion element extending between the fluid and the heating element, said heat-diffusion element having a surface larger than that of the heating element.

16. The optical device according to one of claim 1, further comprising a thermal insulation element between the heating element and the membrane.

17. The optical device according to claim 1, wherein the heating element comprises a heating resistor comprising two connection terminals, the optical device further comprising a control system connected between the terminals of said resistor for passing an electric current through the resistor.

18. The optical device according to claim 17, further comprising a temperature sensor, and wherein the control system is configured for passing an electric current through the heating resistor when the temperature measured by said sensor is less than a threshold.

19. The optical device according to claim 17, wherein the control system is configured for passing an electric current through the heating resistor as soon as one of the following conditions is fulfilled: the actuation device of the membrane is activated, the control system receives a start signal from the device or the response from the optical device is in accordance with the expected response.

20. The optical device according to claim 19, wherein the control system is configured to cease circulating an electric current through the heating resistor at the end of a determined period.

21. An imaging device, comprising:
at least one optical device, comprising:
a deformable membrane,
a support to which a peripheral anchoring area of said membrane is connected,
a cavity filled with a constant volume of fluid, said cavity being delimited by the membrane, a base extending substantially parallel to the membrane and a wall of the support extending between the base and the membrane,
an actuation device of an actuation area of the membrane located between the peripheral anchoring area and a central part of the membrane, configured to bend by application of electrical actuation voltage so as to move some of the volume of fluid located in a flow region located between the actuation area of the membrane and the base of the cavity, said at least one optical device comprising a heating element positioned and adapted to locally heat the fluid in the flow region to facilitate flow of the fluid in the flow region caused by bending of the actuation device.

22. A method for reducing the response time of an optical device, comprising:
a deformable membrane,
a support to which a peripheral anchoring area of said membrane is connected,
a cavity filled with a constant volume of fluid, said cavity being delimited by the membrane, a base extending substantially parallel to the membrane and a wall of the support extending between the base and the membrane,
an actuation device of an actuation area of the membrane located between the peripheral anchoring area and a central part of the membrane, configured to bend by application of electrical actuation voltage so as to move some of the volume of fluid located in a flow region located between the actuation area of the membrane and a face of the support opposite said membrane,
said method comprising:
locally heating the fluid in the flow region to facilitate flow of the fluid in the flow region caused by bending of the actuation device.

23. The method according to claim 22, further comprising measuring a temperature in the environment of said optical device, wherein said heating is carried out when said temperature is less than a threshold.

24. The method according to claim 22, further comprising carrying out said heating as soon as the actuation device is activated.

25. The method according to claim 24, wherein said heating ceases at the end of a determined period.

26. The method according to claim 22, wherein said heating is carried out by pulses.

27. The method according to claim 22, wherein the actuation device of the membrane is a piezoelectric device comprising a stack of a piezoelectric layer and at least two electrodes arranged on either side of the piezoelectric layer, wherein said heating comprises passing an electric current in said electrodes.

28. The method according to claim 27, wherein a difference in potential is applied to the terminals of each electrode in such a way that the difference between the potential of both electrodes is constant.

* * * * *